United States Patent
Danz et al.

(10) Patent No.: US 6,418,366 B1
(45) Date of Patent: Jul. 9, 2002

(54) METHOD FOR RATIO CONTROLLING OR SPEED CONTROLLING

(75) Inventors: Wolfgang Danz, Friedrichshafen; Andreas Piepenbrink, Meersburg; Andreas Schwenger, Friedrichshafen, all of (DE)

(73) Assignee: ZF Batavia, L.L.C., Batavia, OH (US)

( * ) Notice: Subject to any disclaimer, the term of this patent is extended or adjusted under 35 U.S.C. 154(b) by 0 days.

(21) Appl. No.: 09/643,918

(22) Filed: Aug. 23, 2000

(30) Foreign Application Priority Data

Sep. 10, 1999 (DE) .......................... 199 43 336

(51) Int. Cl.[7] .............................................. G06F 7/00
(52) U.S. Cl. .............................. 701/51; 701/60; 701/61; 477/45
(58) Field of Search .............................. 701/51, 60, 61; 477/39, 43, 46, 37, 45, 48, 44, 50; 475/214, 216

(56) References Cited

U.S. PATENT DOCUMENTS

| | | | | |
|---|---|---|---|---|
| 5,521,819 A | * | 5/1996 | Greenwood ................. 701/60 |
| 5,720,687 A | * | 2/1998 | Bennett ..................... 475/214 |
| 5,795,261 A | * | 8/1998 | Speicher et al. ............. 477/48 |
| 6,210,298 B1 | * | 4/2001 | Baur et al. .................. 475/211 |
| 6,216,075 B1 | * | 4/2001 | Speicher et al. ............. 701/51 |
| 6,224,509 B1 | * | 5/2001 | Gierling ..................... 477/45 |

FOREIGN PATENT DOCUMENTS

| | | |
|---|---|---|
| DE | 196 06 311 A1 | 8/1997 |
| EP | 0173482 A1 * | 3/1986 |
| EP | 0210053 A2 * | 1/1987 |

* cited by examiner

*Primary Examiner*—Jacques H. Louis-Jacques
(74) *Attorney, Agent, or Firm*—Davis & Bujold, P.L.L.C.

(57) ABSTRACT

Within the scope of the method for ratio control of a continuously variable automatic transmission of a motor vehicle by means of a control loop structure which contains a non-linear compensation member for the variator and controllers for the pressures of both hydraulic routes of the variator pulleys and the variator routes, the control loop structure contains an interference variable observer which generates an interference force $F_L$ that reproduces the pattern precision wherein the interference force together with the set value for the adjustment gradient which is limited as result of external standards, forms the compensation member.

11 Claims, 1 Drawing Sheet

METHOD FOR RATIO CONTROLLING OR SPEED CONTROLLING

The invention concerns a method for ratio control/rotational speed control for a continuously variable automatic transmission of a motor vehicle.

BACKGROUND OF THE INVENTION

A continuously variable automatic transmission usually consists of a starting unit, a forward-reverse drive unit, an intermediate shaft, a differential, hydraulic and electronic devices and a variator. The variator usually comprises a primary and a secondary variator. In a variator according to the belt-drive principle, the variator is customarily designed with beveled pulleys disposed in pairs and provided with a torque-transmitting belt-drive element which rotates between the two pairs of beveled pulleys. In such a transmission, the actual ratio is defined by the running radius of the belt-drive element which, in turn, is a function of the axial position of the beveled pulleys.

According to the prior art, in the control of continuously variable transmissions, the primary rotational speed of the variator or the engine rotational speed is, as a rule, selected as a control variable for adjusting the operating point predetermined by a superimposed driving strategy.

Customarily, control loop structures such as described in the Applicant's patent No. DE 196 06 311 A1 are used. Such control loop structures combine a physical-mathematical pattern-based linearization of the control system with a linear PID controller, by means of a correcting member (inverse pattern).

According to the prior art the behavior of the hydraulic system is taken into account empirically and, therefore incompletely, within the scope of a very simple mechanical adjustment pattern. This results in a sequence behavior of the control loop that is not optimal, whereby the stationary precision, and the basic dynamics of the closed control loop are impaired.

The speed of the control hydraulics is for this reason a "bottle neck" in the efficiency of the whole control, since it sharply decreases at low temperatures (particularly below 200° C.) when case said pattern-based temperature has not been explicitly taken into account.

SUMMARY OF THE INVENTION

The problem on which this invention is based is, on the basis of the prior art cited, to take temperature dependently and dynamically into account in the hydraulics control in order to improve the basic behavior of the control loop, in a manner such that the stationary precision and the basic dynamics of the control loop are improved during the traction/push load changes.

Another object of the invention is to substantially increase the speed of the control hydraulics and to improve the on and off adjustment in LOW and OD (overdrive).

Accordingly, a state-assessment is proposed to assess an interference force (variable $F_L$) from the adjustment pattern of the variator. According to the invention, this is done by introducing an interference-variable observer. The interference force results from principle-conditioned characteristic line errors, other stationary and dynamic pattern errors, and deficiencies in the easily selected mechanical adjustment pattern. The interference force therefore reproduces all inaccuracies of the mathematical pattern relative to the real system.

Due to the complex adjustment behavior of the variator, a purely pattern-based compensation of errors is possible only by higher order patterns which are purposefully eliminated the scope of the invention.

According to the invention, the adjustment pattern of the variator and the temperature-dependent pressure dynamics for both variator pulleys are taken into account in the controller pattern.

It is assumed that the influence of temperature acts essentially upon the actuator dynamics or adjustment dynamics.

According to the invention, controller adjustment of the corresponding non-linear compensation controller can be automatically adjusted according to current methods, since the entire transmission function is time variant and the time variation consists only of the temperature portions of the hydraulics which are assumed to be quasi-stationary (the oil temperature of the transmission changes slowly compared to the total dynamics.)

The method, according to the invention, is based on a non-linear compensation method according to the principle of exact linearization.

According to the invention, this means that the controller pattern of the hydraulics can be preferred as a block over the inverse route pattern and the route pattern so that a simple transmission function results.

The whole controller design, including the hydraulics routes is possible according to a main feature of the present invention by the compensation control principle, as a temperature-dependent linear control loop which contains only the parameters of controller amplification, attenuation, and time constants of the hydraulics, which on both sides are temperature dependent.

The mechanical stop can be detected by the observer. The system limits LOW and OD are thus specifically detectable relative to the vehicle, by the observer. Other route properties (e.g. variator attenuation) are, likewise, adjustable or also detectable.

BRIEF DESCRIPTION OF THE DRAWINGS

The invention is explained in detail below with reference to the drawing as an embodiment of a belt-drive variator. In the drawing

DESCRIPTION OF THE PREFERRED EMBODIMENTS

Figure 1:
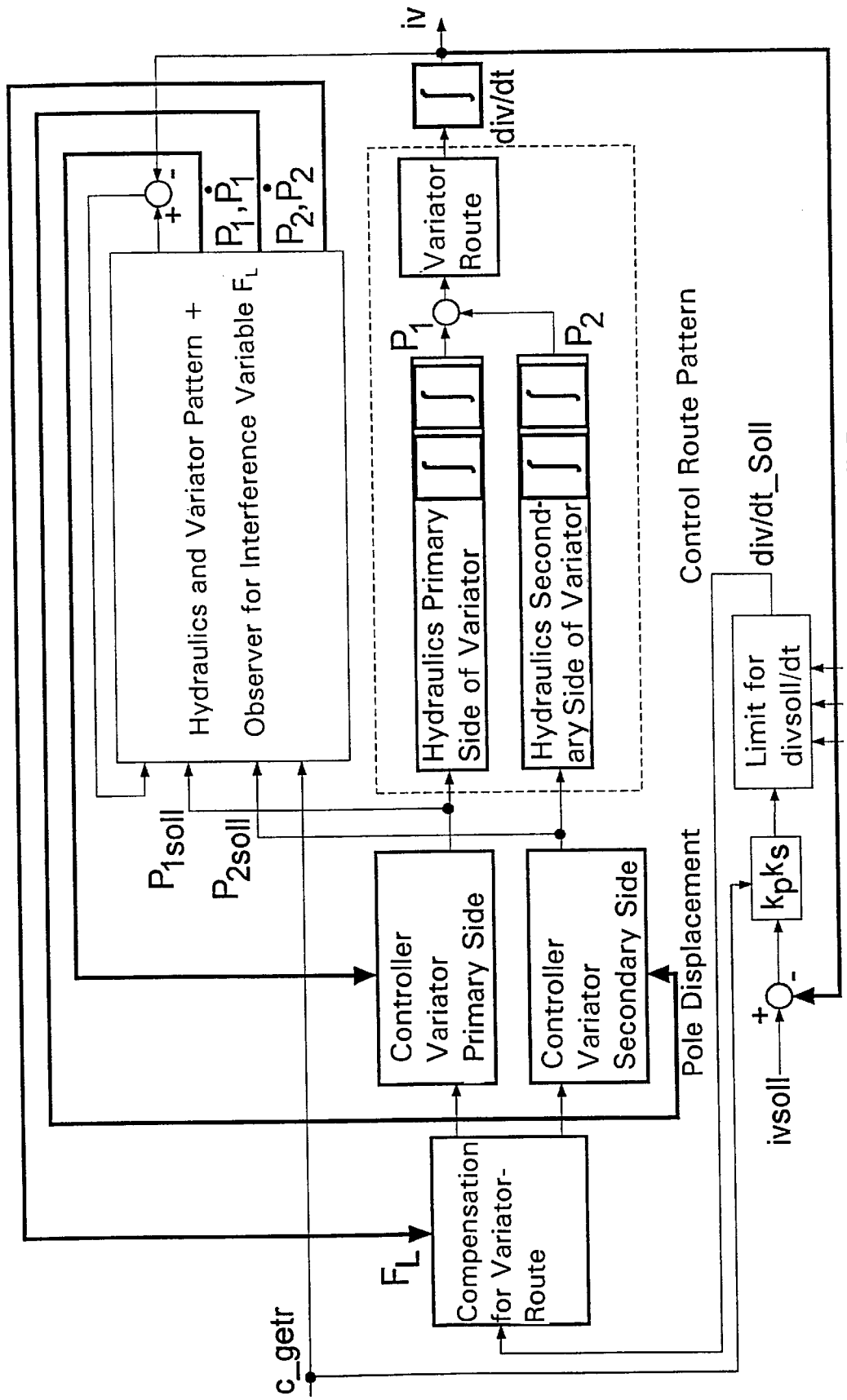
FIG. 1 shows a block gear shift diagram of the whole controller structure according to the invention.

According to FIG. 1, the control loop structure consists of the compensation member for the variator which corresponds to the inverse pattern of the variator route, controllers for both variator pulleys (hydraulics routes) which control the pressures of both pulleys, of the variator route and according to the invention of the interference variable observer which generates the interference force $F_L$. The interference force acts as a pattern error, together with the set value for the adjustment gradient of the variator, which is limited on the basis of external standards such as pump supply amount, forming the input variable for the compensation member.

The routes of the hydraulics are, according to the invention, separately guided via a pattern-based pilot control wherein said control is based on the assessed values of the hydraulic pressures $p_1, p_2$ of the primary and secondary pressure routes $\dot{p}_1, \dot{p}_2$ delivered by the interference variable observer of the dynamic adjustment pattern.

The controller adjustment of the appertaining non-linear compensation controllers, according to the invention, is adjusted automatically (and depending on the oil temperature of the transmission) pursuant to the method of the optimum amount. Thus, independent of temperature, a well attenuated behavior extensively free of overshoot is obtained. Base data for the automatic controller adjustment are measured time and attenuation constants of the hydraulic routes.

The pressure build up in one pulley is approximately described at a temperature working point by a second order linear control system, with attenuation D and time constant T.

The dynamic adjustment pattern used for the interface variable observer and for the control is described for a belt-drive variator by the following equations:

$$\dot{F}_L = 0$$

$$\ddot{p}_1 = -\frac{1}{T_1^2(c\_getr)} \cdot p_1 - 2 \cdot \frac{D_1(c\_getr)}{T_1^2(c\_getr)} \cdot \dot{p}_1 + \frac{1}{T_1^2(c\_getr)} \cdot p_{1Soll}$$

$$p_{1Soll} = f(i_1)$$

$$\ddot{p}_2 = -\frac{1}{T_2^2(c\_getr)} \cdot p_2 - 2 \cdot \frac{D_1(c\_getr)}{T_2^2(c\_getr)} \cdot \dot{p}_2 + \frac{1}{T_2^2(c\_getr)} \cdot p_{2Soll}$$

$$p_{2Soll} = f(i_2)$$

$$\frac{d\,iv}{dt} = \frac{1}{d} \cdot \left( F_L - \frac{A_1}{d} \cdot p_1 - \frac{A_2}{d} \cdot k_p k_s \cdot p_2 \right)$$

with $\rho_1$: pressure in the primary pulley of the belt-drive variator $\rho_2$: pressure in the secondary pulley of the belt-drive variator iv: variator ratio $F_L$: interference force, $\dot{F}_L$ is the mathematical derivative of the interference force $i_1$: power on primary pressure controller $i_2$: power on secondary pressure controller $D_{1,2}$: attenuation constants for primary and secondary pulleys $T_{1,2}$: time constants for primary and secondary pulleys d: variator attenuation $A_{1,2}$: pulley faces of the variator pulleys $k_p k_s$: ratio of the forces on the belt-drive variator $\rho_{1,2soll}$: set values for the pulley pressures (correcting variable of the controller)

$f(i_1)$, $f(i_2)$: characteristic lines (below also designated with #k1 c_getr: transmission temperature $\dot{p}_{1,2}$: value of a mathematical derivative of the primary and secondary variator pressure routes $\ddot{p}_{1,2}$: value of a mathematical second derivative of the primary and secondary variator pressure routes The actually effective dependence of the variator attenuation d on the ratio is disregarded for the pattern of the interference variable observer. According to the invention, the interference variable $F_L$ is assumed as a constant (1), i.e. it proceeds from an altogether constant pattern accuracy. The interference variable $F_L$ can thus be determined according to an assessment method known from the control technique. The position of the pole in the control technique is known to be a measure of the dynamics and stability of the control loop. The speed of change of the interference variable is arbitrarily adjustable by the pole standard.

The objective of the pattern-based pilot control is to influence the 4 hydraulic pole positions of both pressure routes of the primary variator $$s_{1,2,3,4} = \frac{-D_{1,2} \pm \sqrt{1 - D_{1,2}^2}}{T_{1,2}}$$

in such a manner that the new 4 pole positions (provided with the index N)

$$s_{1,2,3,4} = \frac{-D_{N1,2} \pm \sqrt{1 - D_{N1,2}^2}}{T_{N1,2}}$$

can be adjusted for the pressure routes of the primary and secondary pulleys.

A condition for this is that the observer takes into account the correct time constant of the hydraulics. The pilot control receives the pressures $\rho_1$, and $\rho_2$ of the pressure routes of the primary variator (primary pulley) and secondary variator (secondary pulley) and the mathematical derivatives $\dot{p}_1$, and $\dot{p}_2$ thereof from the interference variable observer pattern.

From the transmission function, the P-controlled closed control loop for the command transmission behavior $G_w(s)$ for the control technique in the Laplace range (s)(ivsoll(s) :set ratio):

$$G_w(s) = \frac{iv(s)}{ivsoll(s)} = \frac{k_p(c\_getr)}{T(c\_getr)^2 s^3 + 2D(c\_getr)T(c\_getr)s^2 + s + k_p(c\_getr)}$$

or with PI control:

$$G_w(s) = \frac{iv(s)}{ivsoll(s)} = \frac{k_p(c\_getr)}{T(c\_getr)^2 s^4 + 2D(c\_getr)T(c\_getr)s^3 + s^2 + k_p(c\_getr)s + k_i(c\_getr)}$$

transfer reactions are taken up in the peak modes at different temperature intersection points and with fixed controller adjustment. According to the invention, from said transfer reactions the attenuation parameter D(c_getr) and the characteristic system time constants T(c_getr) are adapted as a characteristic line. From the appertaining hydraulic transfers of both pressure routes of primary and secondary pulleys, the parameters $D_{1,2}(C\_getr)$ and $T_{1,2}(C\_getr)$ likewise are adapted as a characteristic line.

The following hydraulic transmission functions are assumed here:

$$G(s) = \frac{p_1(s)}{p_1 soll(s)} = \frac{1}{T_1(c\_getr)^2 s^2 + 2D_1(c\_getr)T_1(c\_getr)s + 1}$$

and $$G(s) = \frac{p_2(s)}{p_2 soll(s)} = \frac{1}{T_2(c\_getr)^2 s^2 + 2D_2(c\_getr)T_2(c\_getr)s + 1}.$$

Examples are given below of the initiation for different characteristic lines #k1:

Example initialization #k1_iv_D1 (characteristic line ps1 attenuation)

| Parameter | C-getr [Grad] | | | | | | |
|---|---|---|---|---|---|---|---|
| #k1_iv_d1 | −15 | −10 | 0 | 20 | 50 | 90 | 120 |
| D1 | 0.5 | 0.3 | 0.7 | 0.7 | 0.7 | 0.7 | 0.7 |

Example initialization #k1_iv_T1 (characteristic line ps1 time constants)

| Parameter | C-getr [Grad] | | | | | | |
|---|---|---|---|---|---|---|---|
| #k1_iv_T1 | −15 | −10 | 0 | 20 | 50 | 90 | 120 |
| T1 | 0.5 | 0.3 | 0.1 | 0.1 | 0.1 | 0.1 | 0.1 |

Example initialization #k1_iv_D2 (characteristic line ps1 attenuation)

| Parameter | C-getr [Grad] | | | | | | |
|---|---|---|---|---|---|---|---|
| #k1_iv_d1 | −15 | −10 | 0 | 20 | 50 | 90 | 120 |
| D2 | 1.0 | 1.0 | 0.7 | 0.7 | 0.7 | 0.7 | 0.7 |

Example initialization #k1_iv_T2 (characteristic line ps2 time constants)

| Parameter | C-getr [Grad] | | | | | | |
|---|---|---|---|---|---|---|---|
| #k1_iv_T1 | −15 | −10 | 0 | 20 | 50 | 90 | 120 |
| T1 | 0.5 | 0.3 | 0.1 | 0.1 | 0.1 | 0.1 | 0.1 |

From the command transmission function of the closed control loop with P control $$G_w(s) = \frac{k_p(\text{c\_getr})}{T(\text{c\_getr})^2 s^3 + 2D(\text{c\_getr})T(\text{c\_getr})s^2 + s + k_p(\text{c\_getr})}$$

according to the invention, the controller amplification $k_p$ is now temperature-dependently adjusted with the method to the optimum amount of $$k_p(\text{c\_getr}) = \frac{1}{4D(\text{c\_getr})T(\text{c\_getr})}$$

The adaptation of the amplification parameter is thus eliminated.

From the command transmission function of the closed control loop with PI control $$G(s) = \frac{k_p(\text{c\_getr})s = k_i(\text{c\_getr})}{T(\text{c\_getr})^2 s^4 + 2D(\text{c\_getr})T(\text{c\_getr})s^3 + s^2 + k_p(\text{c\_getr})s + k_i(\text{c\_getr})}$$

according to the invention the controller amplification $k_p$ is now temperature-dependently adjusted with the method of the amount optimum to $$k_p(\text{c\_getr}) = \frac{1}{4D(\text{c\_getr})T(\text{c\_getr})}$$

and the I portion temperature-dependently adjusted with the method of the optimum amount of $k_i(\text{c\_getr})=2D(\text{c\_getr})^2$. Adaptation, both of the amplification and of the I portion parameter are thereby eliminated.

What is claimed is:

1. A method for one of ratio control and rotational speed control of a continuously variable automatic transmission, said method comprising:

providing a variator having an adjustment gradient and at least two hydraulic routes each having a pressure, providing at least one controller for each pressure of the at least two routes, providing for the at least one controller a control loop structure means having a non-linear compensation member for the variator, said member corresponding to an inverse pattern of the variator at least two hydraulic routes, providing an interference variable observer, generating an interference force $F_L$ from said variable observer, reproducing a precision pattern, combining the interference force with a set value for the adjustment gradient of the variator, forming an input variable for the compensation member.

2. The method according to claim 1 further comprising the steps of:

assessing the interference force $F_L$ with the interference variable observer, applying a state assessment method wherein the interference force comprises principle-conditioned characteristic line errors, stationary and dynamic hydraulic control errors and hydraulic tolerances, principle-conditioned dynamic pattern errors and deficiencies of a mechanical adjustment pattern.

3. The method according to claim 1 further comprising the steps of:

providing the variator further comprising at least a primary pulley and a secondary pulley, providing the control loop further comprising a temperature-dependent pressure dynamic for the at least primary and secondary pulleys.

4. The method according to claim 3 further comprising the step of:

applying a second order linear control system to approximate a pressure build up in the primary pulley, at a temperature working point, said system having an attenuation (D) and a time constant (T).

5. The method according to claim 1 further comprising the step of:

applying a compensation controller principle to limit a behavior of said control loop to a temperature-dependent linear control loop, said loop comprising a controller amplification parameter, an attenuation parameter and a parameter having time constants of the at least two hydraulic routes, said routes being temperature dependent.

6. The method according to claim 1 further comprising the step of:

adjusting the non-linear compensation member automatically according to current methods of linear control loops.

7. The method according to claim 6 further comprising the steps of:
   adjusting the non-linear compensation member using an optimum amount method,
   providing as basic data for the optimum amount method for the automatic controller adjustment a measured time and at least one attenuation constant of the hydraulic routes.

8. The method according to claim 1 further comprising the steps of:
   guiding the hydraulic routes separately via a pattern-based pilot control,
   assessing a value for each hydraulic pressure of each pressure route of the variator, said variator further comprising a primary variator having a pressure route ($\rho_1$) and a secondary variator having a pressure route ($\rho_2$) and a value for a mathematical derivative of the primary variator pressure route ($\dot{p}_1$) and of the secondary variator pressure route ($\dot{p}_2$),
   basing said pilot control on at least one assessed value for the hydraulic pressures of the pressure routes of the primary variator ($\rho_1$,) and secondary variator ($\rho_2$) and the mathematical derivatives thereof ($\dot{p}_1$, $\dot{p}_2$) which are delivered by the interference variable observer of the dynamic adjustment pattern.

9. The method according to claim 1 further comprising the steps of:
   identifying a dynamic adjustment pattern used for the interference variable and for the controller by equations comprising:

$$F_L = 0$$

$$\ddot{p}_1 = -\frac{1}{T_1^2(\text{c\_getr})} \cdot p_1 - 2 \cdot \frac{D_1(\text{c\_getr})}{T_1^2(\text{c\_getr})} \cdot \dot{p}_1 + \frac{1}{T_1^2(\text{c\_getr})} \cdot p_{1Soll}$$

$$p_{1Soll} = f(i_1)$$

$$\ddot{p}_2 = -\frac{1}{T_2^2(\text{c\_getr})} \cdot p_2 - 2 \cdot \frac{D_1(\text{c\_getr})}{T_2^2(\text{c\_getr})} \cdot \dot{p}_2 + \frac{1}{T_2^2(\text{c\_getr})} \cdot p_{2Soll}$$

$$p_{2Soll} = f(i_2)$$

$$\frac{div}{dt} = \frac{1}{d} \cdot \left( F_L - \frac{A_1}{d} \cdot p_1 - \frac{A_2}{d} \cdot k_p k_s \cdot p_2 \right)$$

with
$\rho_1$: pressure in the primary pulley of the belt-drive variator
$\rho_2$: pressure in the secondary pulley of the belt-drive variator
iv: variator ratio
$F_L$: interference force, $\dot{F}_L$ mathematical derivative of the interference force
$i_1$: power on primary pressure controller
$i_2$: power on secondary pressure controller
$D_{1,2}$: attenuation constants for primary and secondary pulleys
$T_{1,2}$: time constants for primary and secondary pulleys
d: variator attenuation
$A_{1,2}$: pulley faces of the variator pulleys
$k_p k_s$: ratio of the forces on the belt-drive variator
$\rho_{1,2soll}$: set values for the pulley pressures (correcting variable of the controller)
$f(i_1)$, $f(i_2)$: characteristic lines (herebelow also designed with #k1 c_getr: transmission temperature wherein the interference variable $F_L$ is assumed as constant for the interference variable observer
$\dot{\rho}_{1,2}$: value of a mathematical derivative of the primary and secondary variator pressure routes
$\ddot{\rho}_{1,2}$: value of a mathematical second derivative of the primary and secondary variator pressure routes.

10. The method according to claim 1 further comprising the steps of:
   identifying the transmission control function of a P controlled closed control loop for a ratio iv in Laplace range (s)(ivsoll(s):set ratio) by an equation comprising:

$$G_w(s) = \frac{iv(s)}{ivsoll(s)} = \frac{k_p(\text{c\_getr})}{T(\text{c\_getr})^2 s^3 + 2D(\text{c\_getr})T(\text{c\_getr})s^2 + s + k_p(\text{c\_getr})}$$

identifying the transmission control function of a PI controlled closed control loop by an equation comprising:

$$G_w(s) = \frac{iv(s)}{ivsoll(s)} = \frac{k_p(\text{c\_getr})}{T(\text{c\_getr})^2 s^4 + 2D(\text{c\_getr})T(\text{c\_getr})s^3 + s^2 + k_p(\text{c\_getr})s + k_i(\text{c\_getr})}$$

at receiving different temperature intersection points (c_getr),
   receiving at fixed controller adjustment ($k_p, k_i$) jump reactions,
   adapting from said jump reactions attenuation parameters D(c_getr) and characteristic system time constants as a characteristic line,
   adapting from the appertaining hydraulics of both pressure routes of the primary pulley and the secondary pulley parameters $D_{1,2}$(c_getr) and $T_{1,2}$(c_getr) as a characteristic line, and
   applying hydraulic transmission functions comprising:

$$G(s) = \frac{p_1(s)}{p_1 soll(s)} = \frac{1}{T_1(\text{c\_getr})^2 s^2 + 2D_1(\text{c\_getr})T_1(\text{c\_getr})s + 1}$$

and $$G(s) = \frac{p_2(s)}{p_2 soll(s)} = \frac{1}{T_2(\text{c\_getr})^2 s^2 + 2D_2(\text{c\_getr})T_2(\text{c\_getr})s + 1}.$$

11. The method according to claim 1 further comprising the steps of:
   adjusting the command transmission function of the closed control loop with P control by an equation comprising:

$$G_w(s) = \frac{k_p(\text{c\_getr})}{T(\text{c\_getr})^2 s^3 + 2D(\text{c\_getr})T(\text{c\_getr})s^2 + s + k_p(\text{c\_getr})}$$

applying the controller amplification ($k_p$) temperature-dependently using the optimum amount method, by an equation comprising:

$$k_p(\text{c\_getr}) = \frac{1}{4D(\text{c\_getr})T(\text{c\_getr})}$$

adjusting the command transmission function of the closed control loop with PI control by an equation comprising:

$$G(s) = \frac{k_p(\text{c\_getr})s = k_i(\text{c\_getr})}{T(\text{c\_getr})^2 s^4 + 2D(\text{c\_getr})T(\text{c\_getr})s^3 + s^2 + k_p(\text{c\_getr})s + k_i(\text{c\_getr})}$$

applying the controller amplification ($k_p$) temperature-dependently using the optimum amount method, by an equation comprising:

$$k_p(\text{c\_getr}) = \frac{1}{4D(\text{c\_getr})T(\text{c\_getr})}, \text{ and}$$

adjusting the I portion temperature-dependently with the optimum amount method, by an equation comprising: $k_i(\text{c\_getr}) = 2D(\text{c\_getr})^2$.

* * * * *